(12) United States Patent
Caze et al.

(10) Patent No.: US 8,197,769 B2
(45) Date of Patent: Jun. 12, 2012

(54) EXTRUDED BODY DEVICES AND METHODS FOR FLUID PROCESSING

(75) Inventors: Philippe Caze, Fontainebleau (FR); Thierry Luc Alain Dannoux, Avon (FR); Alexander Mikhailovich Efremov, St. Petersburg (RU); Celine Claude Guermeur, Chartrettes (FR); Paulo Gaspar Jorge Marques, Fointainebleau (FR); Keyan Schultes, Corning, NY (US); James Scott Sutherland, Corning, NY (US); Cameron Wayne Tanner, Horseheads, NY (US); John Forrest Wight, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 94 days.

(21) Appl. No.: 12/593,521

(22) PCT Filed: Mar. 31, 2008

(86) PCT No.: PCT/US2008/004174
§ 371 (c)(1),
(2), (4) Date: Jan. 29, 2010

(87) PCT Pub. No.: WO2008/121390
PCT Pub. Date: Oct. 9, 2008

(65) Prior Publication Data
US 2010/0143215 A1    Jun. 10, 2010

(30) Foreign Application Priority Data

Nov. 30, 2007   (EP) ..................................... 07301613
Feb. 29, 2008   (EP) ..................................... 08305041

(51) Int. Cl.
*B01J 19/24*    (2006.01)
(52) U.S. Cl. ...................................................... 422/198
(58) Field of Classification Search .................... 422/198
See application file for complete search history.

(56) References Cited

U.S. PATENT DOCUMENTS 2,572,972 A * 10/1951 Baldwin ........................ 165/168
4,136,675 A *  1/1979 Karasick ........................ 126/667
5,704,415 A *  1/1998 Suzuki et al. ............. 165/104.26

FOREIGN PATENT DOCUMENTS
EP          0787524 A1 *  8/1997
* cited by examiner

*Primary Examiner* — Walter D Griffin
*Assistant Examiner* — Huy-Tram Nguyen
(74) *Attorney, Agent, or Firm* — Gregory V. Bean

(57) ABSTRACT

Disclosed is a device for processing fluids, the device comprising an extruded body having multiple elongated cells therein, the body having a first fluidic passage therethrough defined principally within at least some of said cells, the first fluidic passage having a longitudinally serpentine path back and forth along the at least some of said cells.

43 Claims, 16 Drawing Sheets

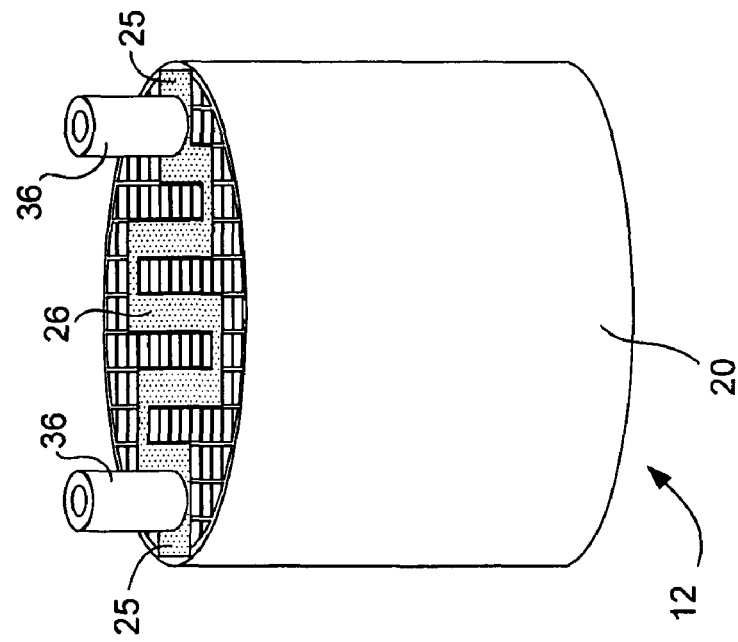
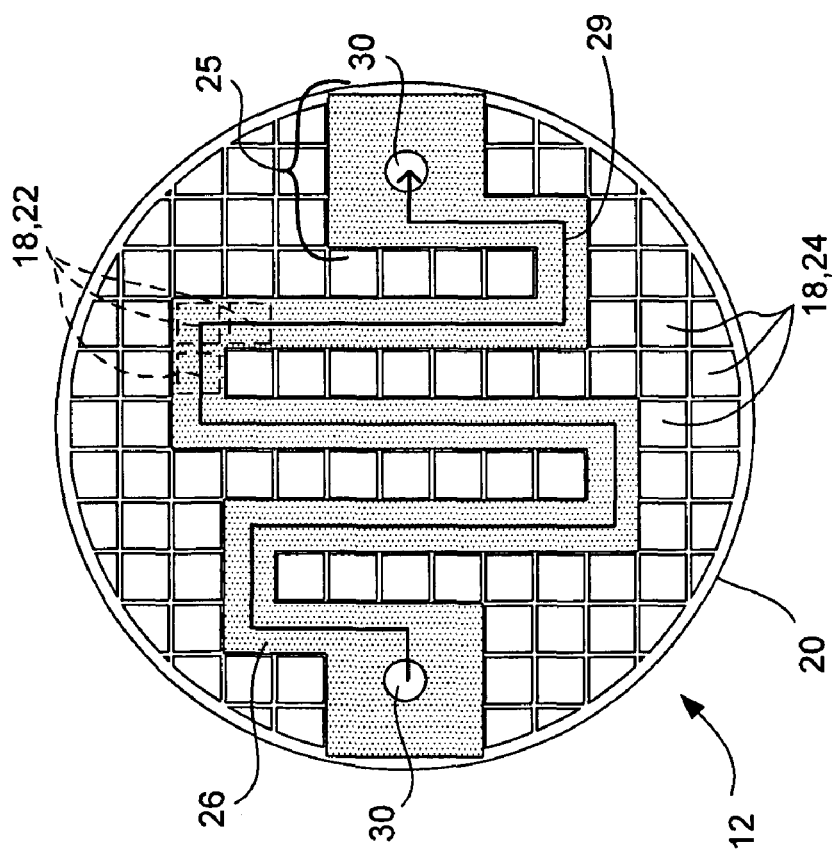
Fig. 8
Fig. 7

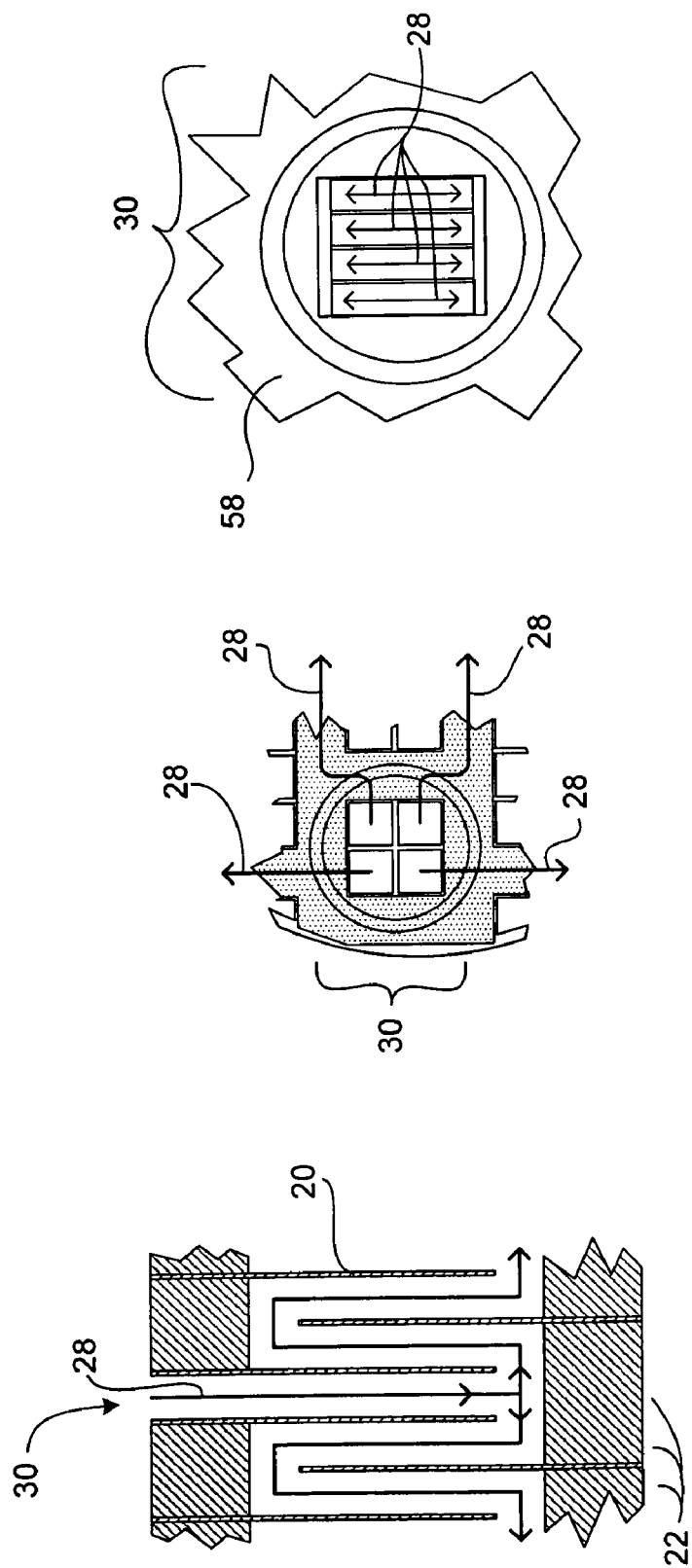

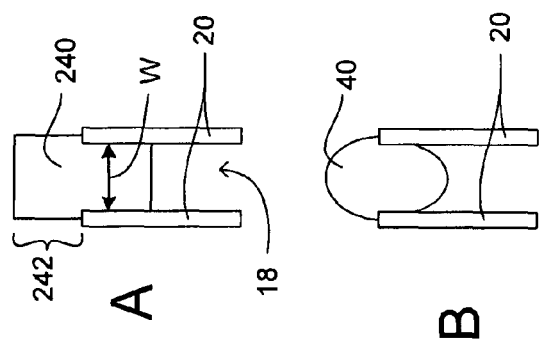
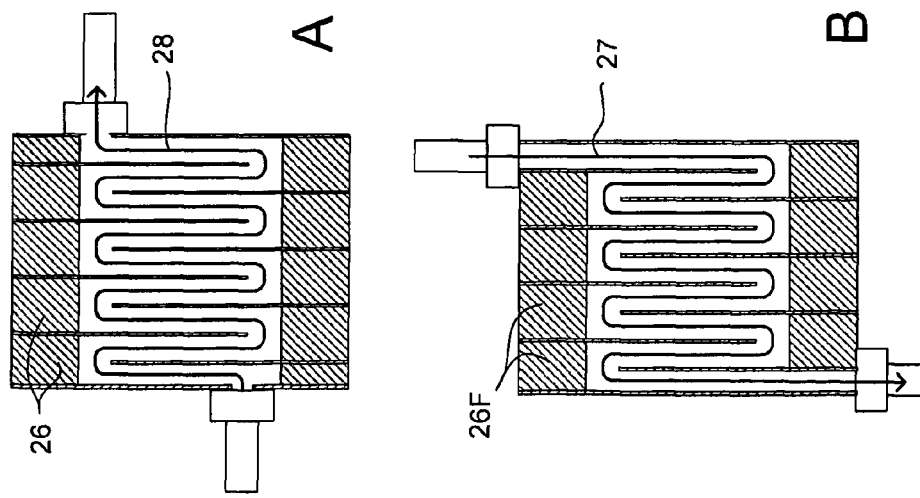
Fig. 29
Fig. 28

US 8,197,769 B2

EXTRUDED BODY DEVICES AND METHODS FOR FLUID PROCESSING

CROSS REFERENCE TO RELATED APPLICATIONS

This application is related to and claims the benefit of co-pending and commonly assigned U.S. Patent Application Ser. No. 60/921,053 filed Mar. 31, 2007, for HONEYCOMB CONTINUOUS FLOW REACTOR; European. Patent Application Serial No. 07301613.1 filed Nov. 30, 2007, for DURABLE FRIT COMPOSITION FOR FABRICATION OF ALUMINA MICROREACTOR COMPONENTS; U.S. Patent Application Ser. No. 61/018,119 filed Dec. 31, 2007, for DEVICES AND METHODS FOR HONEYCOMB CONTINUOUS FLOW REACTORS; U.S. Patent Application Ser. No. 61/063,090 filed Jan. 31, 2008, for DEVICES AND METHODS FOR HONEYCOMB CONTINUOUS FLOW REACTORS; and European Patent Application Serial No. 08305041.9 filed Feb. 29, 2008, for METHODS AND DEVICES FOR FALLING FILM REACTORS WITH INTEGRATED HEAT EXCHANGE.

BACKGROUND

The present invention relates generally to devices and methods for fluid processing, and in particular to extruded-body-based devices for fluid processing.

SUMMARY

In one alternative embodiment of the present invention, a device for processing fluids is provided, the device comprising an extruded body having multiple elongated cells therein, the body having a first fluidic passage therethrough defined principally within at least some of said cells, the first fluidic passage having a longitudinally serpentine path back and forth along the at least some of said cells. In another alternative embodiment of the present invention, a method of making a device for processing fluids is provided, the method comprising providing an extruded body having extended cells therein and interconnecting at least some of said cells so as to form a first fluidic passage through said body defined principally within said at least some of said cells, the fluidic passage having a longitudinally serpentine path back and forth along the at least some of said cells.

In yet another alternative embodiment of the present invention, a method for processing a fluid is provided, the method comprising the steps of providing an extruded body having multiple elongated cells therein, the body having a fluidic passage therethrough defined principally within a first plurality of said cells, the fluidic passage having a longitudinally serpentine path back and forth along the first plurality of said cells, at least a portion of the fluidic passage, with respect to a plane perpendicular to the cells, lying in path bordered by a second plurality of cells not of the first plurality; and flowing a fluid to be processed in the fluidic passage while flowing another fluid in one or more of the second plurality of cells.

In still another alternative embodiment of the present invention, a method for processing a fluid is provided, the method comprising the steps of providing an extruded body having multiple elongated cells therein, the body having a fluidic passage therethrough defined principally within a first plurality of said cells, the fluidic passage having a longitudinally serpentine path back and forth along the first plurality of said cells, at least a portion of the fluidic passage, with respect to a plane perpendicular to the cells, lying in path bordered by a second plurality of cells not of the first plurality; and flowing a fluid to be processed in one or more of the second plurality of cells while flowing another fluid in the fluidic passage.

BRIEF DESCRIPTION OF THE DRAWINGS

FIG. 7 is a plan view of reactor comprising an extruded multicellular body or honeycomb showing an alternate fluidic path in a plane perpendicular to the cells according to an embodiment of the present invention.

FIG. 8 is a side elevation view of the device of FIG. 7 showing fluidic couplers on the extruded body according to one embodiment of the present invention.

FIG. 14 is cross-sectional view of cells closed on one or both ends of an extruded body, showing a method useful in the context of the present invention for manifolding or dividing fluid pathways, with two pathways beginning from one and beginning within the extruded body.

FIG. 15 is a partial plan view of one end of an extruded body or honeycomb structure showing multiple passages beginning within the extruded body at an input port on the one end of the extruded body.

FIG. 16 is a partial side view of an extruded body or honeycomb structure showing multiple passages beginning within the extruded body at an input port on a wall on a side of the extruded body.

FIG. 28A is a cross section through the plug or plugs 26 of FIG. 27A, in the horizontal direction in FIG. 27.

FIG. 28B is a cross section through the plug or plugs 26F of FIG. 27A, in the horizontal direction in FIG. 27.

FIGS. 29A and 29B are cross sections of an individual plug or row of plug material being formed according to the methods useful in the context of the present invention.

DETAILED DESCRIPTION

Figure 2:
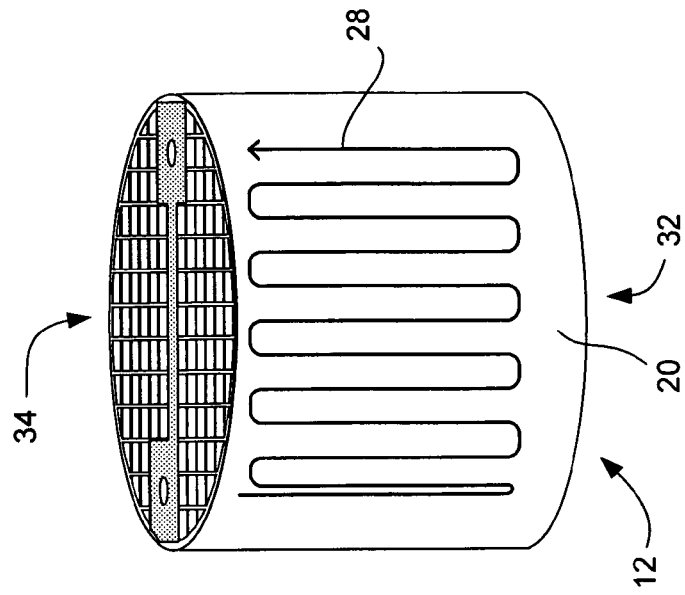
FIG. 2 is a side elevation view of the device of FIG. 1 comprising an extruded multicellular body, showing additional detail of a fluidic path according to an embodiment of the present invention.

Reference will now be made in detail to the presently preferred embodiments of the invention, instances of which are illustrated in the accompanying drawings. Whenever reasonable, the same reference numerals will be used throughout the drawings to refer to the same or like parts.

Figure 1:
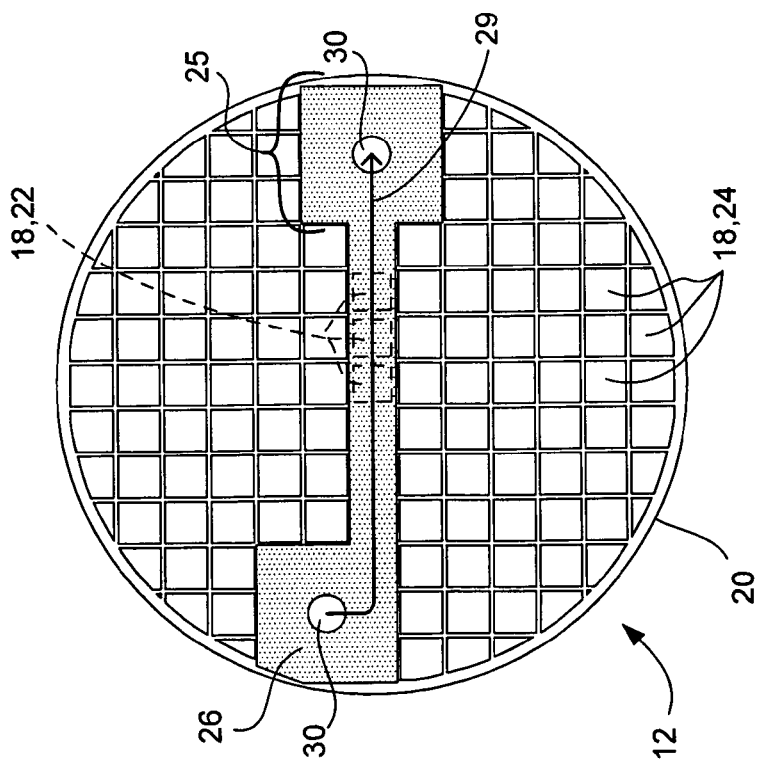
FIG. 1 is a plan view of a device for fluid processing, such as a heat exchanger or combination heat exchanger and reactor, comprising an extruded multicellular body or honeycomb showing a fluidic path in a plane perpendicular to cells of the body according to one embodiment of the present invention.

The present invention relates to a device 12 for processing fluids, such as a reactor or heat exchanger, or combination reactor and heat exchanger, for example, comprising an extruded body or monolith 20 having multiple elongated cells 18 therein, an embodiment of which is represented in plan view in FIG. 1, and in perspective view in FIG. 2. The extruded body 20 has a first fluidic passage 28 therethrough, defined principally within at least some of said cells 18, the first fluidic passage 28 having a longitudinally serpentine path back and forth along the at least some of said cells 18, as seen in FIG. 2. The first fluidic passage 28 is preferably defined within a first plurality 24 of the cells 18, as seen in FIG. 1. At least a portion of the first fluidic passage 28, with respect to a plane perpendicular to the cells as shown in the view of FIG. 1, preferably lies in a path 29 bordered by a second plurality of cells 22 not of the first plurality 24. For highest heat exchange capability, it is preferable that the path 29 is only one or two cells wide over all or at least the major portion of its length, with a width of one cell shown in this case, although paths multiple cells wide may also be used. A narrow path allows for a large ratio of contact-area to volume for the passage 28—that is, a large ratio of (1) the contact area of the passage 28 with cells 22 of the second plurality, to (2) the volume of the first fluidic passage 28, which large contact area to volume ratio is beneficial for heat exchange or for other purposes requiring close proximity of the passage 28 to the cells 22. In the embodiment shown in FIGS. 1 and 2, the cells 24 of the first plurality are also contiguous, which is generally preferable for efficient use of space within the body 20.

Figure 4:
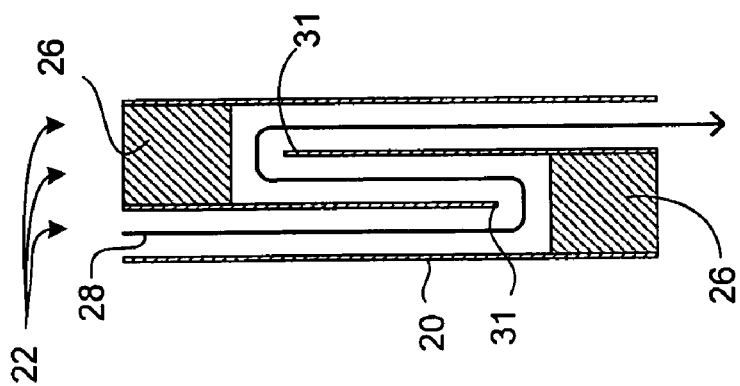
FIG. 4 is a cross-sectional view similar to that of FIG. 3, useful for illustrating the meaning of the term serpentine as used herein.
Figure 3:
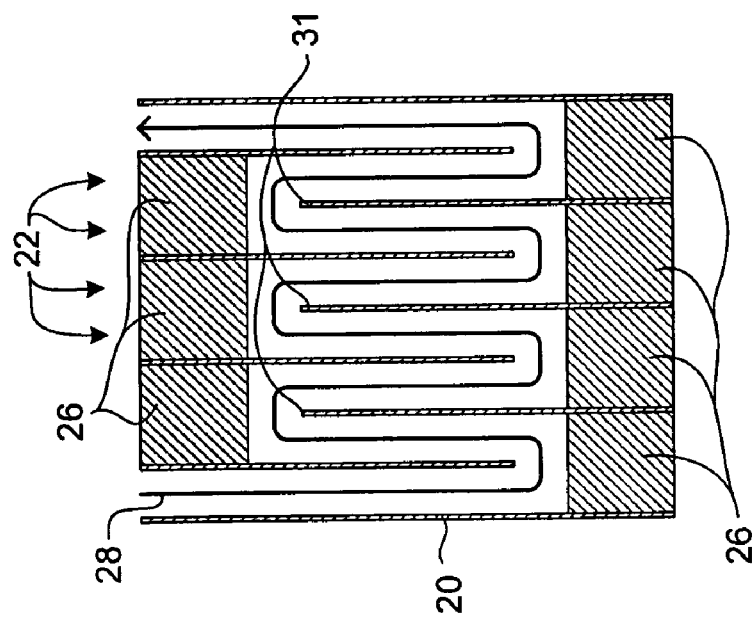
FIG. 3 is a cross-sectional view of cells closed on one or both ends of an extruded body, showing one method useful in the context of the present invention for interconnection between cells.

In the particular embodiment shown in FIGS. 1 and 2, the first fluidic passage 28 is defined in part by one or more plugs 26 positioned at one or more ends of said body 20. This may be seen in more detail, in another example embodiment, in the cross section of FIG. 3. Selected end portions of walls 31 dividing the cells 22 which cooperate to in part define the passage 28 have been removed, and plugs 26 have been positioned such that the material forming the plugs 26 is spaced apart from the remaining portion of the walls 31, so as to interconnect the cells 22. The first fluidic passage 28 is thus defined within cells 22 of the first plurality, and is in part defined also by plugs or continuous plugging material 26. Note that the passage 28 need not have as many bends as that of FIG. 3 to qualify as serpentine as this term is used herein. It is sufficient that the passage forms an "S" shape in the longitudinal direction, that is, the direction along the cells, as shown in FIG. 4.

Figure 6:
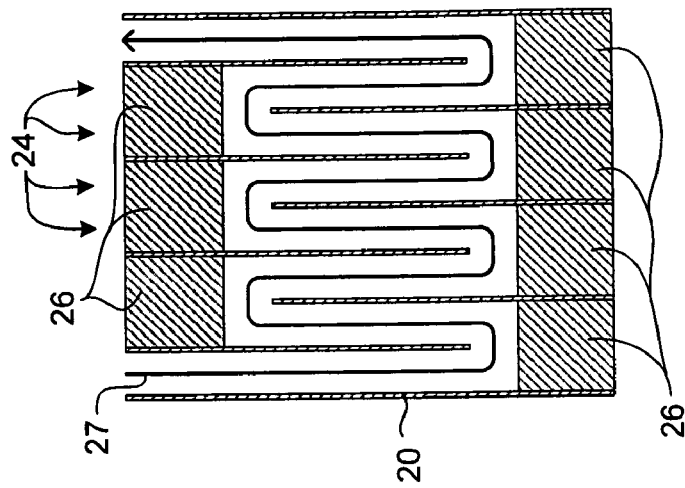
FIG. 6 is a cross-sectional view of the device of FIG. 5.

The cells 24 of the second plurality may be all open in parallel, such that one or more fluids may be flowed straight through the body 20 along the cells 24, as shown generally in FIGS. 1 and 2. Alternatively, as shown generally in FIGS. 5 and 6, where the cross section of FIG. 6 is taken generally along a path 23 shown in FIG. 5, at least one second fluidic passage 27 may be defined principally within at least some of the cells 24 of the second plurality, the second fluidic passage 27 also having a longitudinally serpentine path back and forth along the at least some of said second plurality of cells 24. In the embodiment shown, the second fluidic passage 27, with respect to a plane perpendicular to the cells 18 of the body 20, lies in the path 23 shown in FIG. 5.

In another embodiment of the present invention, the path is not serpentine only in the direction along the cells as shown in FIG. 2, but also in the plane perpendicular to the cells, as shown in the plan view of FIG. 7. The first plurality of cells 22 in the plan view of FIG. 7 is arranged in a generally serpentine path in the plane perpendicular to the cells 18. The fluid passage 28 is thus serpentine at a relatively higher frequency in the longitudinal direction, in and out of the plane of FIG. 7, and at a relatively lower frequency in the perpendicular direction, within the plane of the figure. This doubly serpentine path structure allows for high total path volume and long total path length while maintaining a large surface area between the path and the cells 24, and allows for small total package size for the device 12.

The serpentine arrangement of the first plurality of cells 22, visible in FIG. 7, is one preferred embodiment of the present invention; other arrangements are possible or even desirable, depending on the application. It is generally preferable, for highest heat exchange, as mentioned above, regardless of the shape of the path within the plane of FIGS. 1, 5 and 7, that the majority of the path be narrow, only one or two cells wide. This results first fluidic passage 28 capable of having very high surface to volume ratio and long length in a compact volume, but one that is nonetheless easily manufactured.

Figure 5:
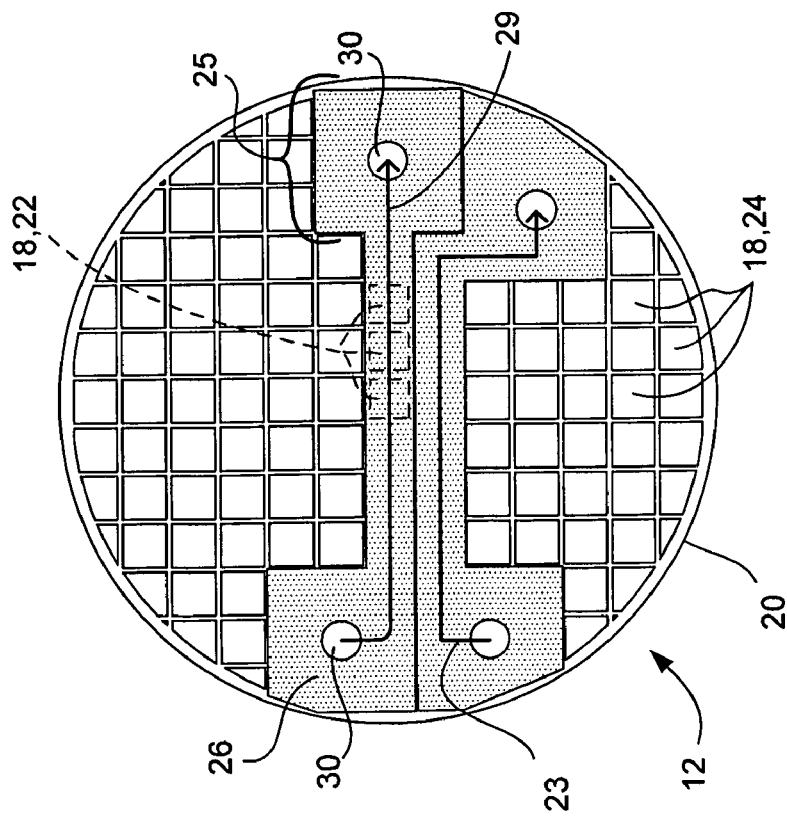
FIG. 5 is a plan view of reactor comprising an extruded multicellular body or honeycomb showing a second fluidic path in a plane perpendicular to the cells according to another embodiment of the present invention.

Additional cells of cells 18, in a grouping 25 of more than one cell in width, if desired, may be plugged around entry and exit ports 30 of the passage 28 and path 29, as shown in FIGS. 1 and 5. These additional plugged cells can provide support for an O-ring seal or a fired-frit seal or other sealing system for providing a fluidic connection to the passage 28, and optionally may not form a part of the passage 28. One alternative is shown in the embodiment of FIG. 8, in which access tubes 36 have been sealed to two groupings 25 of plugged cells. As may be seen from the figure, this has the effect of putting fluidic passage 28 in fluid communication with the exterior of the extruded body 20 through an end of the extruded body. Both ends may be used if desired.

The extruded body or honeycomb 20 is desirably formed of an extruded glass, glass-ceramic, or ceramic material for durability and chemical inertness, although any extrudable material having desired properties could potentially be used, including such widely varying materials as metals, polymers, graphite/carbon, etc. Carbon or metal monoliths may be coated, such as with enamel or PTFE coatings, for example. Alumina ceramic is generally presently preferred as having good strength, good inertness, and higher thermal conductivity than glass and some ceramics. The multicellular body may have a cell density of as much as 200 cells per square inch. Higher densities can lead to higher heat exchange performance devices. Bodies having 300 or more, or even 450 or more cells per square inch are of potential interest for forming high heat-exchange performance devices.

Figure 9:
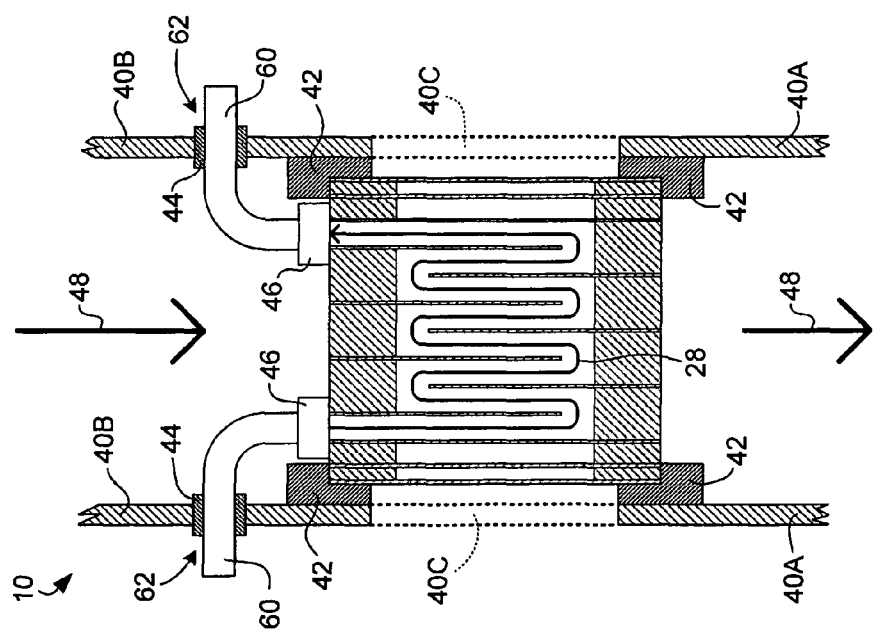
FIG. 9 is a cross-sectional view of one embodiment of a fluidically connected device of the present invention.

FIG. 9 is a cross-sectional view of a fluidically connected device 10 for fluid processing, comprising an extruded multicellular body 20 and showing one alternative for providing fluid connections to the extruded body 20. In the embodiment of FIG. 9, a fluid housing 40 supports the extruded body via seals 42. The housing 40 may comprise a single unit enclosing the extruded body, or the portions 40C may optionally be excluded, such that the housing comprises two parts 40A and 40B. A fluid passage 48, which may be used for flowing a thermal control or other fluid, is formed through the second plurality of cells 24—which are in this case open, as shown in FIGS. 1 and 7—in cooperation with the housing 40. The fluid passage 48 thus constitutes another type of second fluidic passage, comprising a single pass through the body, in parallel through multiple cells of the second plurality of cells, in contrast to the second passage 27 of FIG. 5. Both types may be used in the same body 20, if desired.

In the device 10 of FIG. 9, Passage 28 in the body 20 is accessed via fluid conduits 30 through fluidic couplers 46. Fluid conduits 60 pass through openings 62 in the housing 40, in which openings 62 a seal 44 is employed.

Figure 10:
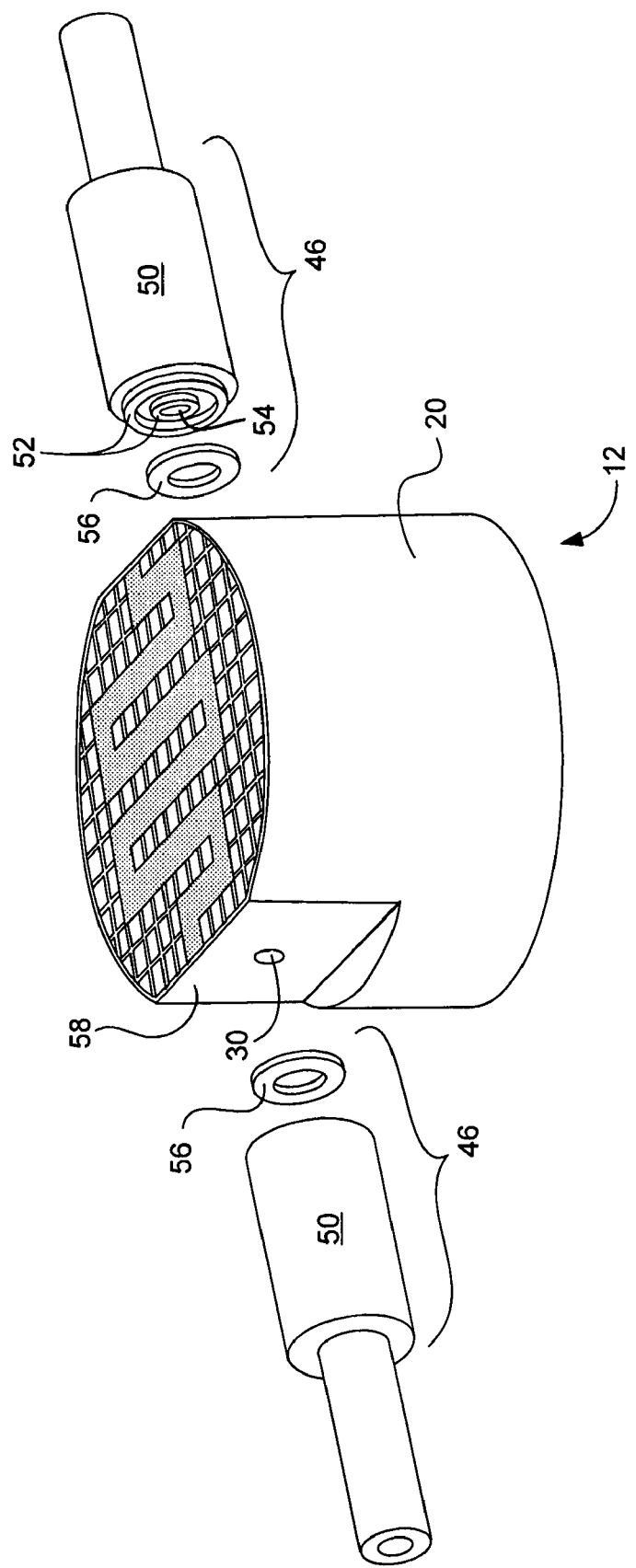
FIG. 10 is an exploded perspective view of a device comprising an extruded multicellular body or honeycomb, showing fluidic couplers coupled to input and output ports at the side(s) of the extruded body.

FIG. 10 is an exploded perspective view of a reactor 12 comprising an extruded multicellular body or honeycomb, showing fluidic couplers 46 arranged for coupling to input and output ports 30 at the side(s) of the extruded body 20. Fluidic couplers 46 include a fluid coupler body 50 having raised concentric rings 52 surrounding a fluid passage 54. When assembled, an elastomeric O-ring 56 is retained by the raised rings 52 in compression against a flat surface 58 formed on the sided of the body 20. The flat surface 58 may be formed by removing a few rows of cells 18 in the area where the fluid connection is to be made. The large number of wall structures per unit area remaining within the extruded body 20 has been shown to provide sufficient support for a robust compression seal against the flat surface 58.

Figure 11:
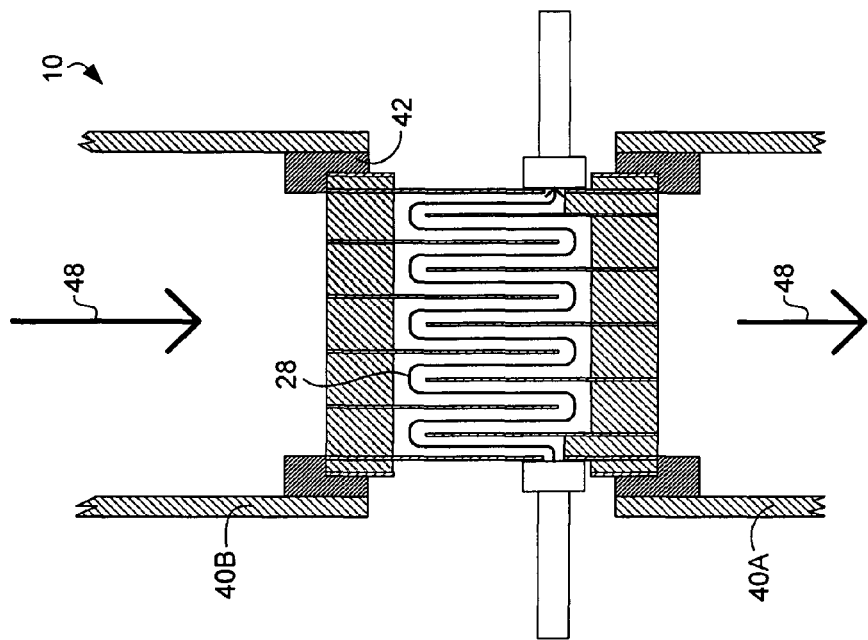
FIG. 11 is a cross-sectional view of a reactor of the present invention comprising an extruded multicellular body or honeycomb showing fluidic connections to the extruded body according to another embodiment of the present invention.

A device 12 such as the one in the embodiment of FIG. 10, arranged such that the first fluidic passage 28 is in fluid communication with the exterior of the extruded body 20 through a surface 58 of the extruded body 20 generally parallel the cells 18, allows for a preferred configuration of a fluidically connected device 10. As shown in FIG. 11, this preferred arrangement is shown in cross-sectional view of the connected device 10 comprising an extruded multicellular body or honeycomb 20 with fluidic connections to the body 20. Features corresponding to the embodiment of FIG. 9 are labeled accordingly. Advantages over the embodiment of FIG. 9 include the absence of seals 44, and absence of any seal (such as seals 44 or fluidic couplers 46) directly between the two fluid passages 28, 48. Seal materials may thus be optimized for the fluid of each path independently, and seal failures, if any, will not result in fluids from the two passages 28, 48 intermixing.

Figure 13:
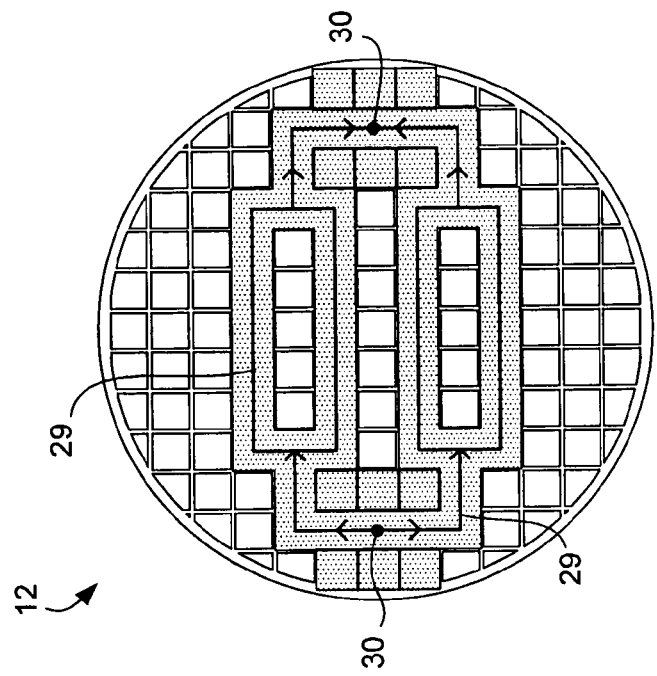
FIG. 13 is a plan view of a device comprising an extruded multicellular body or honeycomb showing still another fluidic path in a plane perpendicular to the cells according to an embodiment of the present invention.
Figure 12:
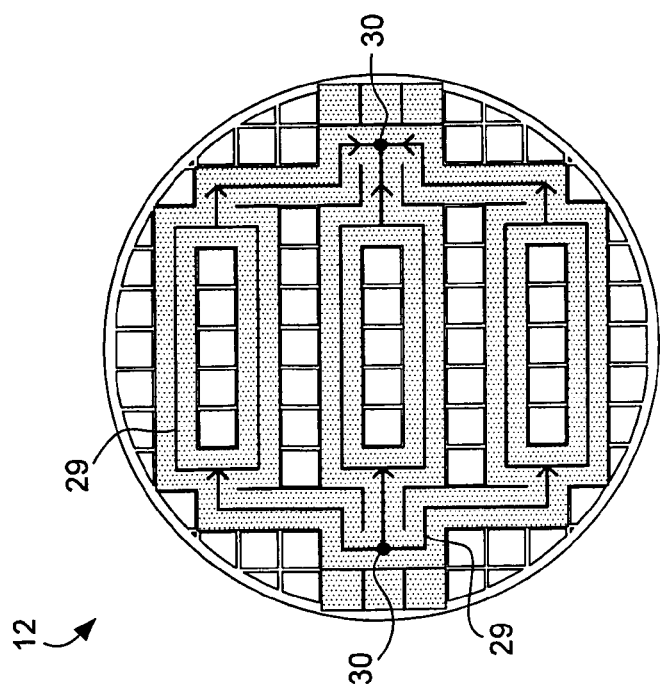
FIG. 12 is a plan view of a device comprising an extruded multicellular body or honeycomb showing yet another fluidic path in a plane perpendicular to the cells according to an embodiment of the present invention.

FIGS. 12 and 13 are plan views of devices 12 for fluid processing comprising an extruded multicellular body or honeycomb 20 showing still another fluidic path 29 in a plane perpendicular to the cells 18, according to additional alternative embodiments of the present invention. As may be seen in the figures, these embodiments include manifolding within the fluid path 29, such that the path 29 divides into parallel paths in the plane perpendicular to the cells. FIG. 14 is cross-sectional view of cells 22 of the first plurality, closed on one or both ends of the extruded body 20, showing one method useful in the context of the present invention for manifolding or dividing a fluid path 29 and passage 28 to achieve the paths 29 shown in FIGS. 12 and 13, with two fluid passages or branches of a fluid passage 28 dividing from one in a plane parallel to the cells 22, 24, and beginning to branch within the extruded body 20.

Manifolding with the resulting multiple paths may be used where it is desired to reduce the pressure drop of fluids moving through the device. FIG. 15 is a partial plan view of one end of an extruded body or honeycomb structure showing a method of or structure for manifolding having multiple parallel branches of passage 28 or and/or path 29, beginning within the extruded body at an input port 30 on the one end of the extruded body. Such manifolding is achieved by simply increasing the number of unplugged cells at the port 30 from one to four, as shown, or more.

FIG. 16 is a partial side view of an extruded body or honeycomb structure showing another embodiment of multiple passages 28 beginning within the extruded body at an input port 30 on a wall or flat surface 58 on a side of the extruded body, such as shown in FIG. 10. Similarly to the embodiment of FIG. 15, multiple parallel branches of fluidic passage 28 and path 29 are achieved by providing an opening of the port 30 that is large relative to the size of the cells 18. In addition to providing access to multiple cells in parallel— four in the figure—the passage 28 may lead in both directions, as one alternative, as shown by the arrows. Using only one direction for each branch of the passage 28 is also an alternative.

Figure 17:
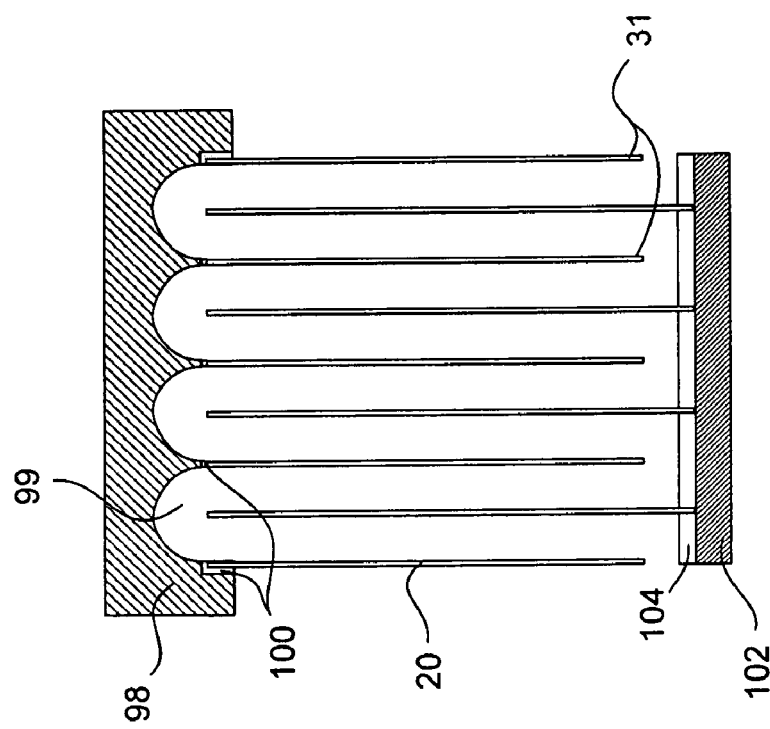
FIG. 17 is a cross-sectional view of an extruded body or honeycomb showing alternative embodiments of fluidic interconnections between cells of the body.

As an another alternative feature applicable to all of the embodiments of the present invention, the function of plugs 26, in defining a portion of the first fluidic passage 28 or the second fluidic passage 27 may be performed instead by one or more caps 98, 102 positioned at one or more ends of the body 20, as shown in FIG. 17. Two variations of caps 98, 102 are shown in the cross section of FIG. 17. Cap 98 includes recesses or passages 99 that serve as fluid interconnects to put successive cells of the body 20 in fluid communication. The walls of body 20 are accordingly not required to be shortened as is generally required in the case of the plugs 26 shown in other embodiments. A sealant or gasket material 100 may employed to assist in sealing the cap 98 to the body 20. Cap 102 is in the form of a flat end plate which cooperates with shortened walls 31 of the body 20 to form a fluidic path through the body. A sealant or gasket 104 may likewise be employed.

Figure 18:
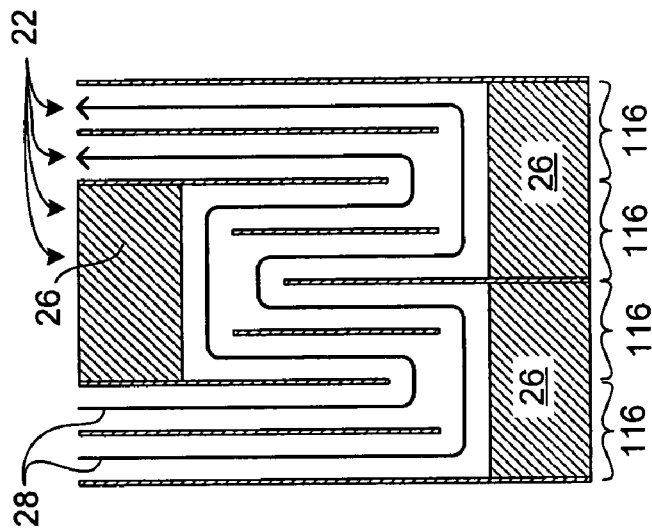
FIG. 18 is a cross-sectional view of cells closed on one or both ends of an extruded body, showing another method useful in the context of the present invention for interconnection between cells.

As another variation applicable to all embodiments of the present invention, a portion of either the first fluidic passage 28 or the second fluidic passage 27, or both, may follow multiple successive respective groups 116 of two or more cells in parallel, as shown in FIG. 18. In the case of the embodiment of FIG. 18, the multiple successive groups 116 each contain two cells 22 of the first plurality, and the first fluidic passage 28 follows multiple successive pairs of the cells 22, as shown.

Figure 19:
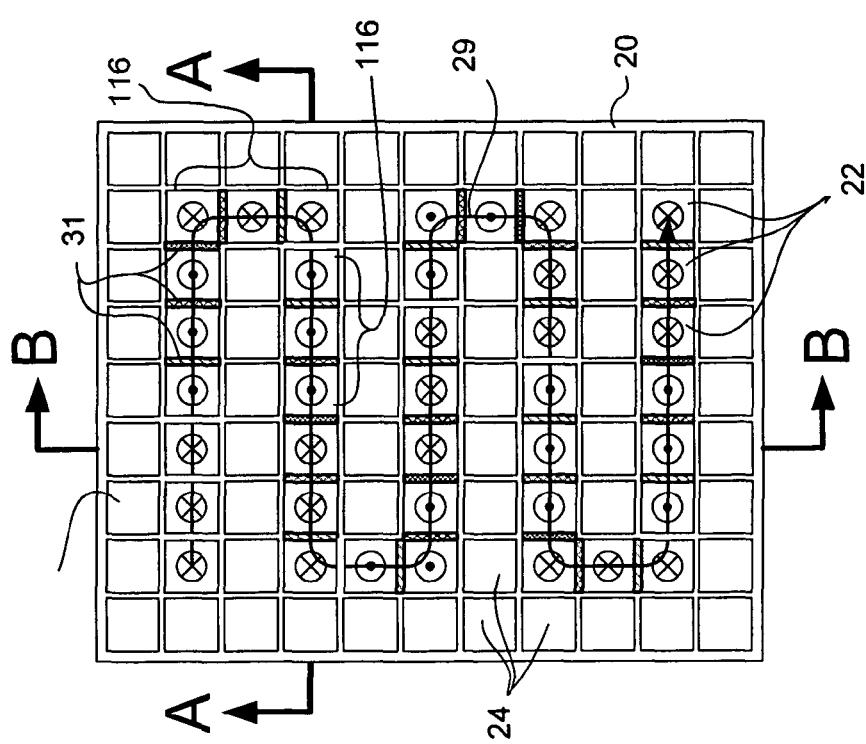
FIG. 19 is a diagrammatic plan view of an extruded multicellular body or honeycomb showing additional detail of a fluidic path according to one alternative embodiment of the present invention.

FIG. 19 shows a plan view of an extruded body 20 in which the fluidic passage 28 follows multiple successive respective groups 116 of three cells in parallel. Shortened walls 31 are desirably removed to various levels indicated by their relative shading. Path 29 is serpentine in the plane perpendicular to the cells 18. All, or desirably at least a majority, of cells to either side of the path 29 are cells 24 of the second plurality which are not part of the cells 22 of the first plurality. The path 29 is desirably one cell wide.

Figure 20:
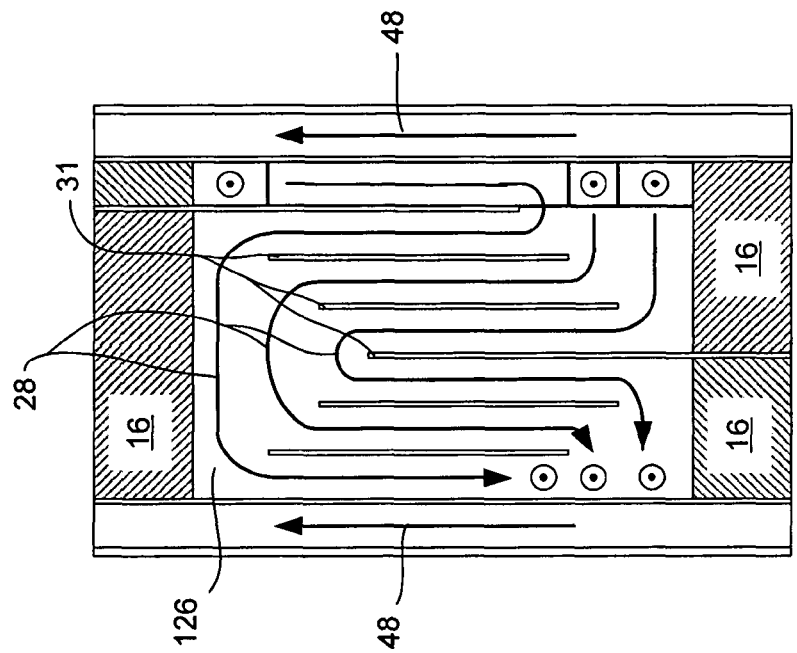
FIG. 20 is a cross-sectional view of the body of FIG. 19 taken along the line A-A in FIG. 19.

FIG. 20 is a cross-sectional view of the body of FIG. 19 taken along the line A-A in FIG. 19. As may be seen in the cross-section of FIG. 19, selected walls 31 are partially removed at one end of the body 20. Desirably the central wall between the successive groups 116 of cells has more material removed than the other walls between the groups. In the embodiment shown in FIG. 20, plugs 26 are used to seal the ends of the cells 22 in which the passage 28 is formed. The next successive groups 16 are fluidic ally joined by a chamber 126 defined at least in part by the walls 31 of reduced longitudinal extent between the groups 116, and by the plugs 26 closing off the groups 116 and the passage 28 defined within them from the exterior of the body 20. The arrows show a general direction of flow within the passage 28 intended for reactants or other fluids such as thermal control fluids. The arrows representing passage 48 show a sample of a direction of flow within the open cells 24 of the second plurality useful for flowing another fluid such as a thermal control fluid or a reactant.

Figure 21:
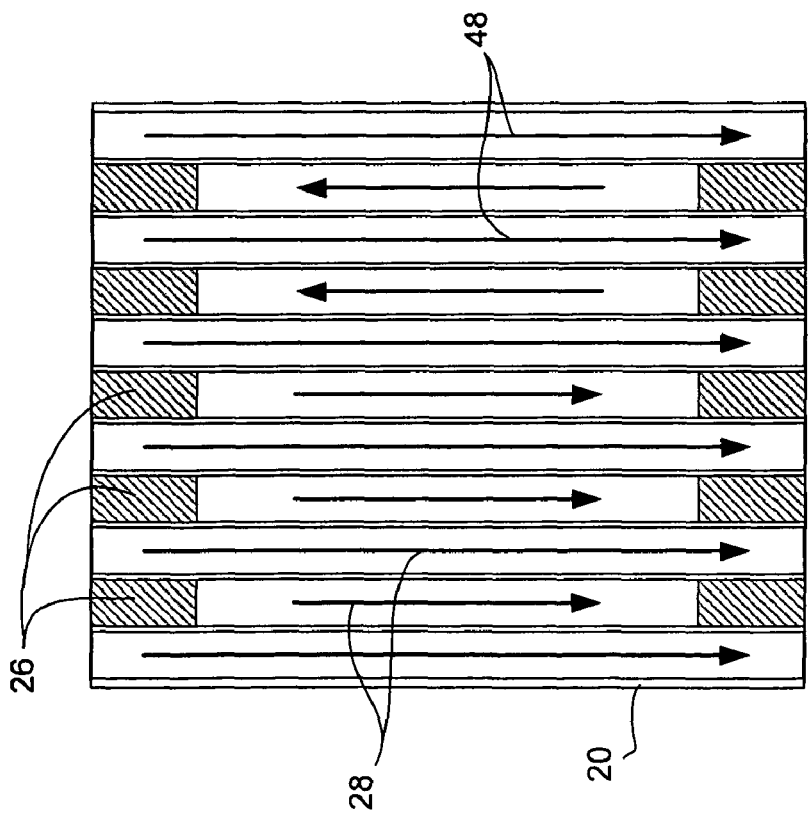
FIG. 21 is a cross-sectional view of the body of FIG. 19 taken along the line B-B in FIG. 19.

FIG. 21 is a cross-sectional view of the body of FIG. 19 taken along the line B-B in FIG. 19. The plugs 26 seal off the passage 28 from the exterior of the body 20. As seen in this view, the plugs 26 are narrow in at least one cross section, providing more than sufficient contact area with the body 20 for good sealing.

Figure 22:
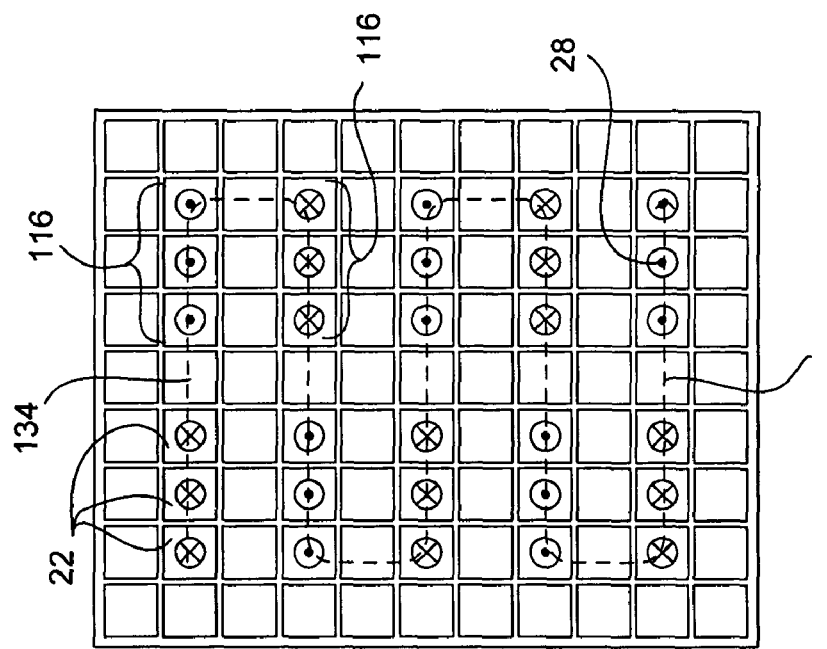
FIG. 22 is a diagrammatic plan view of an extruded multicellular body or honeycomb showing a fluidic path in a plane perpendicular to the cells and flow directions within the cells according to still another embodiment of the present invention.
Figure 23:
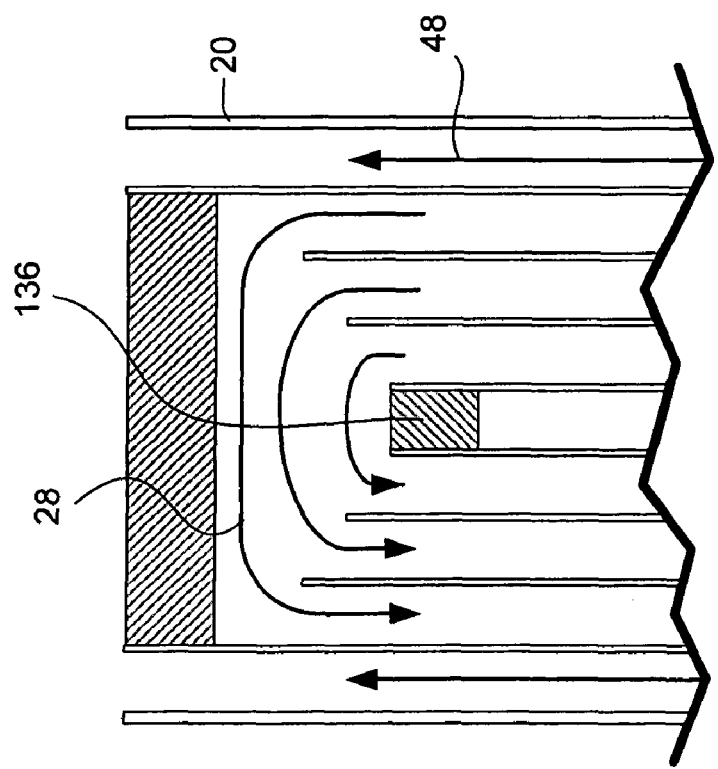
FIG. 23 is a partial cross-sectional view of an alternative embodiment of a portion of the structure shown in 20.

FIG. 22 shows an alternate configuration of the groups 116 of cells 22 in which the passage 28 is defined, in which the successive groups 116 are separated by respective empty cells 134. The empty cells 134 may be sealed from the passage 28 by an inner plug 136 as shown in FIG. 23. This results in the first fluidic passage 28 being defined in part by one or more plugs 136 positioned between the fluidic passage 28 and the main portion of said body 20. Optionally, a small cap may be used in place of plug 136. The empty cells 134 may be used to thermally isolate successive groups 116 from each other, if desired.

Figure 24:
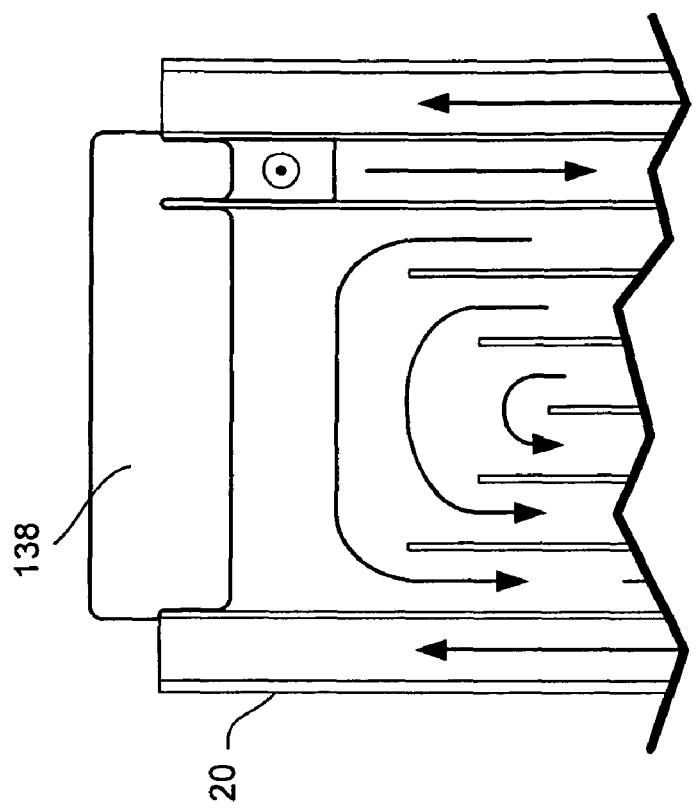
FIG. 24 is a partial cross-sectional view of another alternative embodiment of a portion of the structure shown in 20.

FIG. 24 is a partial cross-sectional view of an extruded body showing an alternative sealing embodiment useful with potentially all other embodiments and variations of the present invention. In this embodiment, a removable plug or end cap 138 is used. Removable plug or endcap 138 materials may include chemical resistant polymers or the like. Removable plugs or endcaps 138 may be useful for cleaning the reactor devices, or more particularly, for facilitating catalyst deposition, recovery, or regeneration. The endcaps such as endcaps 98 and 102 may be in removable form also, as an alternative.

Figure 25:
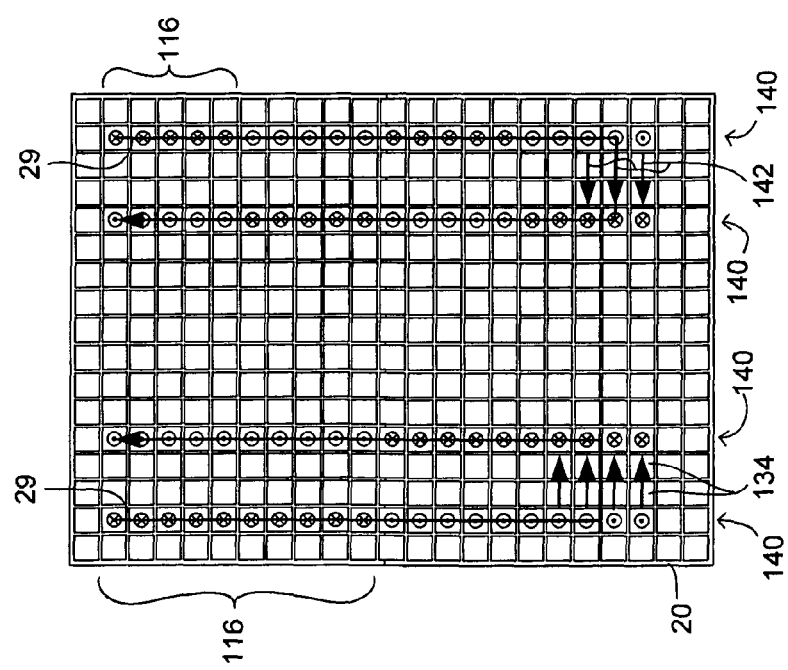
FIG. 25 is a diagrammatic plan view of an extruded multicellular body or honeycomb showing two alternate fluidic paths in a plane perpendicular to the cells and flow directions within the cells according to additional alternate embodiments of the present invention.

FIG. 25 is a diagrammatic plan view of an extruded multicellular body or honeycomb 20 showing two alternate paths 29 in a plane perpendicular to the cells, and flow directions within the cells, according to additional alternate embodiments of the present invention. As shown in FIG. 25, the successive groups 116 of cells need not be limited to two or three cells grouped for parallel flow as a part of the passage 28. Greater numbers of cells may be used per group 116, such as five as shown on the right of the figure, or ten as shown on the left, or potentially even more. In cases where decreased flow resistance in the passage 28 is desired, lager groups 116 may be used. Interconnections 142 between successive rows 140 of cells within the passages 28 may also be paralleled, that is, they may be multiple cells wide, if desired, for lower flow resistance within the passage 28. These features may be used combination with one or more empty cells 134. Paralleled interconnections 142 between rows 140 results in a path 29 which is single-cell-wide in the principle, long-length sections of the rows 40. Desirably, at least half, more desirably over at least 70%, still more desirably 80%, and most desirably 90% of the path length is single-cell width.

Figure 26:
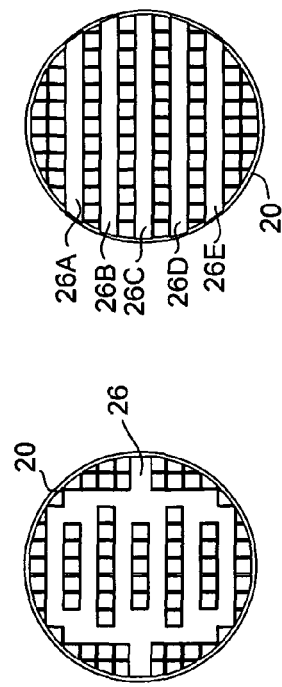
FIGS. 26A and 26B are plan views of additional embodiments of fluid paths in a plane perpendicular to the cells of an extruded body.

FIGS. 26A and B show additional alternative patterns for the plugs or continuous plug material 26, corresponding to the pattern of the path 29 and passage 28 beneath. In each case, the fluid path defined within the main portion of the closed cells is serpentine along the direction of the cells, in the direction in and out of the figures. In FIG. 26A, the path is parallel with manifolding within the body 20, and in 26B the path is parallel with manifolding, if any, external to the body 20.

Figure 27:
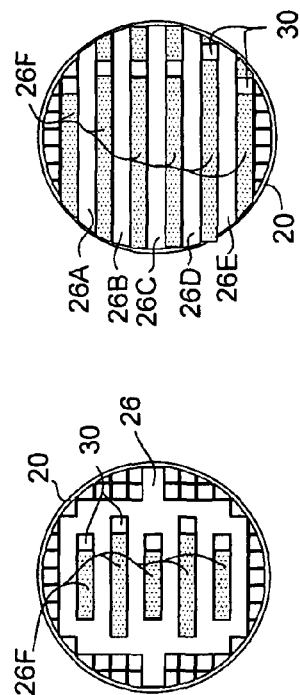
FIGS. 27A and 27B are plan views of additional embodiments of multiple fluid paths in a plane perpendicular to the cells of an extruded body.

FIGS. 27A and B show an additional embodiment of the present invention whereby a counter-current flow or co-current flow heat exchanger or reactor may be formed. Additional plugs or plugging material 26F forms multiple parallel second fluidic passages 27 within the body 20, and leaves multiple access ports or openings 30. FIG. 28A is a cross section through the plug or plugs 26 of FIG. 27A, in the horizontal direction in FIG. 27. Plugs 26 define in part the first fluidic passage 28. FIG. 28B is a cross section through the plug or plugs 26F of FIG. 27A, in the horizontal direction in FIG. 27. Plugs 26F define in part a second fluidic passage 27 that lies adjacent to and along the direction of the first fluidic path such that co-current or counter-current flow in adjacent cells of the body 20 is possible in the first and second fluidic passages relative to each other. The second fluidic path may thus be put in either a counter-current flow direction or a co-current flow direction to the first fluidic passage 28, depending on the relative directions of fluid flow supplied to the two passages.

Various processes and compositions may be used for forming the plugs 26 or continuous plug material 26 to plug the cells of the monoliths 20. What is desirable is a robust and simple process to provide plugs that are leak-free at pressures up to 55 bar or even higher, and are chemically resistant to a wide range of acids, bases and solvents. The present invention includes such a process, one embodiment of which may be described with reference to FIG. 29.

Given an extruded monolith 20 having a plurality of cells extending along a common direction and one or more end faces at which one or more of the cells are open, and given that the open cells include some to be sealed and some to remain open at a given sealing step, the plugging method shown in with respect to FIG. 29 includes filling the open end of one or more of the cells to be sealed with a plug 240 comprising a glass frit, typically with an organic binder, such that an exterior portion 242 of the plug extends beyond the end of the cell, and such that the exterior portion 242 of the plug also extends beyond the width W of the cell, as shown in FIG. 29A for one cell 18 of a monolith 20. The monolith 20 and the plug 240 are then heated together sufficiently to cause the glass frit to consolidate and flow sufficiently to seal the respective cell, as shown in FIG. 29B, which shows a representative plug profile after heating.

Figure 30:
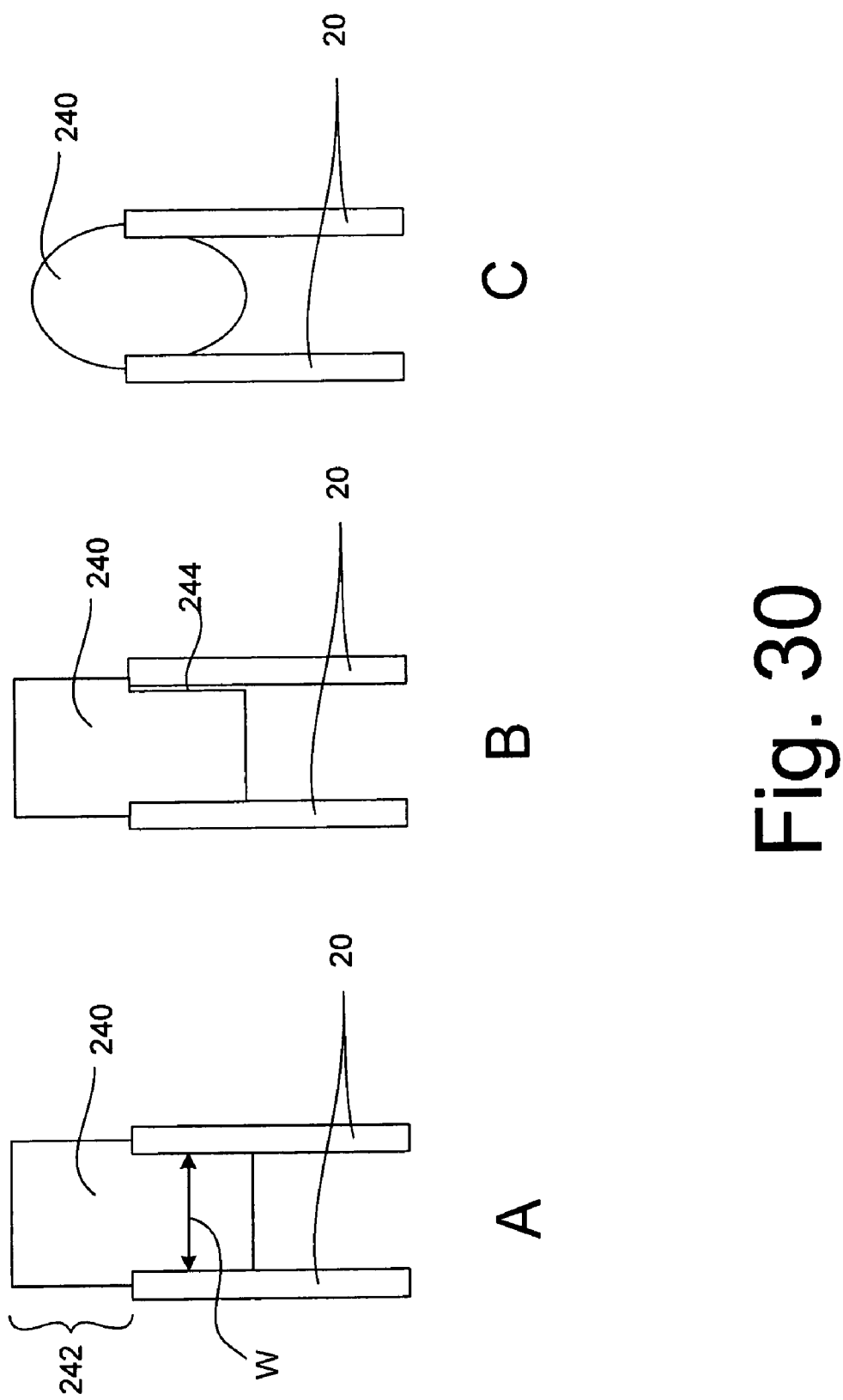
FIGS. 30A-30C are cross sections like those of FIGS. 6A-6B illustrating plug formation as presently understood according to the methods useful in the context of the present invention.

Although not wishing or intending to be bound by theory, the inventors offer the following as their current understanding of the basic operation of this process: Starting with a plug 240 of the form shown in FIG. 30A, as the plug is first heated, debinding of the glass frit and binder mixture, and/or consolidation of the frit cause shrinkage of the plug 240 without significant flow or deformation of the glass. This results in the plug 240 pulling away from one or more of the walls of the cell to be plugged, leaving a gap 244 represented in FIG. 30B. Because the exterior portion 242 of the plug 240 extends sufficiently beyond the width W of the cell, the plug 242 remains in contact with the top surface of the wall where the gap 244 is opened. This allows the plug to flow, as it softens and begins to round, under the influence of surface forces, back against the wall where the gap was opened, sealing the gap closed and providing a robust and leak-free seal in a single heating step.

Figure 31:
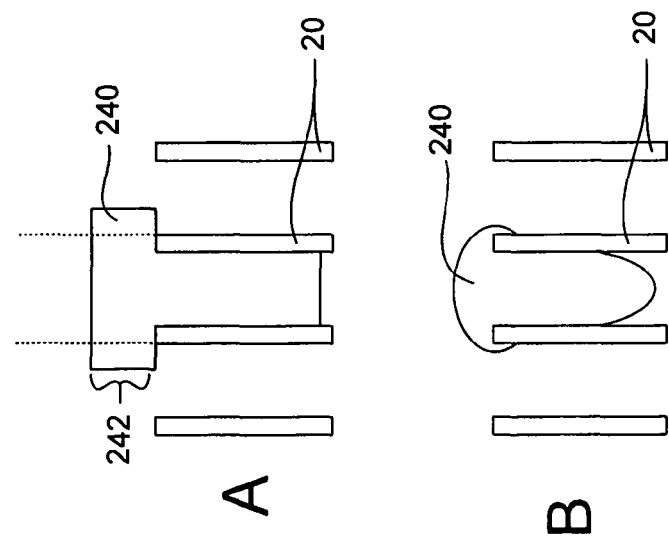
FIGS. 31A-31B are cross sections like those of FIGS. 29A-29B showing a plug 240 being formed according to another embodiment of the methods useful in the context of the present invention.

It is also possible, according to another aspect of the present invention, to utilize the flow properties of the softened glass in order to provide a large margin of error in the sealing process. This may be accomplished by filling the open end of one or more of the cells to be sealed with a plug 240 comprising a glass frit, such that an exterior portion 242 of the plug extends beyond the end of the cell, and such that the exterior portion 242 of the plug also extends beyond the outward surface of one or more walls of the cell, as shown in FIG. 31A for one cell of a monolith 20, where the position of the outward surface of the walls of the cell is shown by the dotted lines extending upward therefrom. The depth of the unheated plug may also be adjusted as desired, with deeper plugs, such as the one in FIGS. 31A and 31B, typically providing a more robust seal, at the expense of somewhat reduced internal volume. The monolith and the plug are then heated together sufficiently to cause the glass frit to consolidate and flow sufficiently to seal the respective cell, as shown in FIG. 31B, which shows a representative plug profile after heating. Because the glass tends to contract and to pull into itself, the adjacent cells intended to remain open in this operation are not plugged, but the finished plug 240 of FIG. 31B covers the potentially sharp corners of the monolith walls, reducing the likelihood of forming stress-concentrating geometry in the wall plus finished plug structure.

Figure 32:
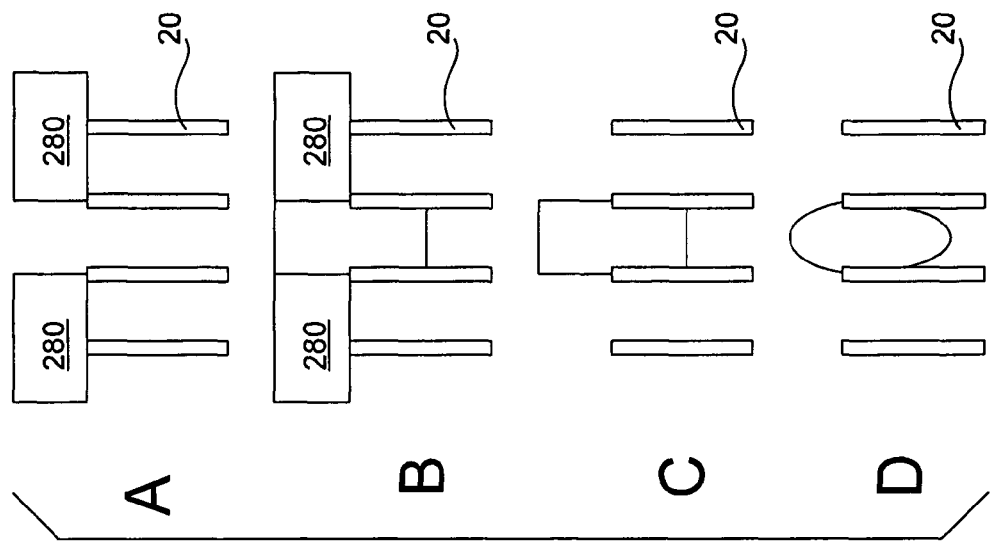
FIGS. 32A-32D are cross sections like those of FIGS. 29A-29B showing a plug 240 being formed according to yet another embodiment of the methods useful in the context of the present invention

One useful way of efficiently producing the pre-fired plugs described above is illustrated in FIGS. 32A-D. FIG. 32A shows a cross-section view of a monolith 20 at an end face thereof where all cells but the one in the middle are covered by a thick mask 280, such as a tape mask. The thick mask 280 may be 1-2 mm thick, and may be formed by one or two layers of a thick pressure sensitive tape material or a flexible molded mask material such as silicone, for example. The edges of the mask 280 are positioned so that they do not completely cover the tops of monolith walls on either side of the end cell to be plugged.

Glass-based plug material is then applied to the monolith end face so that it flows between the two parts of the mask 280 and into the ends of the cells of monolith 20, as shown in FIG. 32B. The plug material can be a paste at room temperature that is spread over the mask with a spatula so that excess plug material is removed. Alternatively the plug material can be suspended in a wax binder, and a layer of plug material may be spread over a hot plate so that it forms a uniform thin layer (1-2 mm thick), and then the monolith end face with the thick mask 280 may be is pushed into the thin layer of melted plug material. The hot plate may then be cooled or allowed to cool, so that the plug material solidifies and adheres to the monolith and mask.

The thick mask 280 is then removed from the monolith end face, leaving the glass-based plug material in FIG. 32C with an exterior portion 242 of the plug 240, as labeled in FIG. 30A, extending beyond the end of the cell, that is, beyond the monolith end face. The exterior portion 242 of the plug 240 extends beyond the width W of the cell to be plugged so that it contacts at least a portion of the tops of the monolith walls that are adjacent to the cell.

Next the monolith is heated to bond the glass-based plug material to the monolith and form a leak-free seal. During the initial heating portion of sintering cycle the plug material polymer binder is burned off, as described above with respect to FIG. 30. This results in a partial shrinkage of the plug material. It is important that the plug material remains in contact or close proximity to the monolith walls during this and any subsequent plug shrinkage as the sintering cycle continues. This contact or proximity is required so that when the plug material is heated to an elevated temperature so that it flows, it is close enough to wet all four adjacent monolith walls, or at least all of the adjacent walls that remain after any previous machining or other process to selectively remove walls. This wall wetting prevents the formation of gaps and provides a robust seal.

Surface tension effects can also work to coax plug materials into closer contact with the monolith walls. For example, the initially square corners on the plug material are rounded during sintering, resulting in limited transport of plug material downward to locations near the plug-wall interface, with a final plug generally of the shape shown in FIG. 32D.

As an alternative embodiment to ease fabrication, the mask 280 in the form of tape other organic material may be burned out or ashed in the same step as heating the monolith and plug together to form the seal.

One preferred embodiment of the present invention may be produced by extruding and sintering a body comprising glass frit, such as 7761 Pyrex® glass frit for example, followed by redrawing the extruded sintered body into a parallel-sided shape, then finishing the ends at which the cells open to obtain flat top and bottom and a desired length.

The resulting extruded body may then be simply sealed with a plate, which is preferably made from the same material as the body, in order to allow a simple glass-to-glass thermal sealing.

The plate may have an engraved cavity allowing a simple "U turn" communication for adjacent cells, such as in the form of end cap 98 of FIG. 17, described above. Such engraving can take the form of chemical etching after resin masking, hot glass embossing, glass frit micromolding, or in the form of more conventional means such as machining and sand blasting. Cavity dimensions correspond to cell dimensions, and can be 0.5 mm deep for one size of redrawn extruded body, for example. Cell dimensions of the body can range from 10 μm up to 1 mm for example, depending of the redraw ratio employed.

Redrawn glass cell webs are typically 100 μm thick for 1 mm$^2$ section, and less than 20 μm for 0.01 mm$^2$. Cooling and heating means such as other liquids or heating elements can thus be very close to areas to be thermally controlled. The cellular body cells can be chemically functionalized before individual cutting and both polishing of the ends, such as surface treatment to give a non-wetting surface on a cell wall, for example.

This redrawn glass embodiment may be preferred where extremely small cells are desired such as may be desirable for some biological and pharmaceutical processing.

Experimental

Alumina Extruded Body With Glass Plugs

Alumina extruded monoliths were selected for study because of their strength, inertness, and reasonably good thermal conductivity. A glass composition was developed and selected for use because of its excellent CTE match to alumina and its very good chemical resistance. The glass composition is given in Table 1 below:

TABLE 1

| Material | mol % |
|---|---|
| SiO2 | 76.5 |
| B2O3 | 3.2 |
| Al2O3 | 3.0 |
| Na2O | 14.4 |
| ZrO2 | 2.9 |

The glass composition, in the form of a frit, was mixed with a wax-based binder (Cerdec MX4462 wax, manufactured by Cerdec France, S. A.) at an amount of 17% by weight, by to form the final plug composition. Next a mask was applied to the end face of an alumina monolith with pre-cut end walls. The tape mask was positioned so that two long cell regions were not masked by the tape. Meanwhile the plug material was heated on a hot plate at 125° C. so that it melted and spread into a thin layer 1-2 mm thick. The alumina monolith end face was then applied onto the molten plug material so that the plug material flowed through the gaps in the mask and into the ends of the cells of the monolith. After the plug material and the alumina monolith cooled, the mask was removed.

The alumina monolith was then sintered at 875° C. for 30 minutes. The monolith was placed in the furnace horizontally (on its side) so that the two plug ridges were oriented parallel to the floor of the furnace. During sintering the plug material slumped such that it remained in contact with the walls of the alumina monolith. Long bond lines between the resulting plug and the alumina monolith were produced on both of the non-shortened sidewalls. Some asymmetry of the plug shape resulted from the alumina monolith being sintered resting on one side, but the targeted cells were successfully sealed. Visual inspection of the interface between the glass plug material and the alumina monolith sidewall at the end face confirmed good wetting all along both sides of the plug ridge. The 116 plug material extended over the alumina monolith sidewall tops, with no gaps visible along the plug-sidewall interface. Also, the CTE match with the alumina monolith was excellent, and no shrinkage cracks or other defects appeared within the plug material along its entire length.

The glass composition used is believed to give satisfactory results when within the following compositional limits in mole percent (mol %) of:

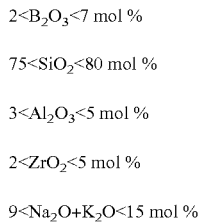

$2 < B_2O_3 < 7$ mol %

$75 < SiO_2 < 80$ mol %

$3 < Al_2O_3 < 5$ mol %

$2 < ZrO_2 < 5$ mol %

$9 < Na_2O + K_2O < 15$ mol %

$0 < \text{alkali earth} + \text{lanthanide} < 15$ mol % and wherein the total mole percent of SiO2, AlO3 and ZrO2 together is greater than 82 but less than 86, and wherein the total mole percent of B2O3, Na2O, K2O, alkali earths and lanthanides together is greater than 13 and less than 18.

Glass Extruded Body, Redrawn, with Glass Sealing

A portion of a redrawn 600-8 Pyrex® extruded body was cut at 20 mm length. Both faces were polished, and 1 mm of the ends of the walls were removed, (such as shown in regard to the shortened walls 31 of FIG. 17) in order to simplify cell communication on the prototype without requiring structuring of the end plates. The top plate was drilled for two inputs and one output installation. The end plates where then thermally assembled on the extruded cellular Pyrex® body in an oven at 780° C. for 20 minutes. An adhesive could have been used, if needed, to preserve any surface treatment.

Two colored fluids were then injected, which both followed a serpentine path, alternating, up and down to pass from cell to cell, up to the mixing area where the passages joined, and where the fluids quickly diffused one in the other, thanks to the numerous U turns presenting a local section change.

Mixing may be improved, if desired, by using alternatively larger and smaller cell sections, as may be obtained by using one and then several cells in parallel.

Producing Alumina Extruded Bodies

Extrusion

Two-inch (5.08 cm) diameter 400/4 and 200/6 substrates were extruded using a twin-screw extruder, with the following composition:

Inorganics (100 wt. % total):
Alumina—A3000 F (Alcoa), 75 wt. %
Calcined Alumina A3000 (Alcoa), 25 wt. %

Solid binder/Organic (wt % relative to total weight of inorganic materials):
Methylcellulose—(Methocel F240, Dow) 5 wt. %
Oleic Acid, 2 wt. %

Water call: (target of 9.5 wt % relative to total weight of inorganic materials)

The following process was used: Hand mix water. Start with 17 wt. % water and decrease by 2%. When batch reaches the correct water call, then complete an extrusion using 400/4 and 200/6 die.

Sintering

Substrates maintain shape during 1650° C. sintering (with 7% shrinkage). High-aspect ratio substrates (length=2.7× dia.) were successfully sintered standing on end without sag or "elephant foot" effects. Sintering cycle for two-inch diameter substrates:

Ramp from 20° C. to 300° C. at 50° C./min (5.8 hr)
Ramp from 300° C. to 550° C. at 21° C./min (12.1 hr)
Ramp from 550° C. to 1700° C. at 100° C./min (11.0 hr)
Dwell at 1700° C. for 4.0 hours.

Ramp from 1700° C. down to 20° C. at 100° C./min (16.8 hr)

SEM images of sintered alumina substrates confirmed closed-pore structure.

Alumina substrates have also been successfully sintered at 1750° C. for four hours. Substrates shrank by 11.0% and were visibly light yellow instead of the white substrates produced when sintering at 1750° C.

Alumina Plug Materials and Sintering

A variety of alumina and glass plug compositions have been explored. Useful compositions and methods include: (1) Organic plugs useable with pre-sintered alumina substrates allowing a low-temperature cure (20-150° C.) (2) Alumina plugs used to plug green alumina substrates, followed by sintering at 1700° C. and (3) Glass-based plugs used with pre-sintered alumina substrates and sintered at 700-800° C.

Organic Plugs Using Silicone Adhesives

Silicone adhesives provide good chemical resistance and operate over a broad temperature range. They also enable simple tape masking processes and room temperature curing. Individual plugs have been tested to 6.8 bar pressure without leakage or failure.

Organic Plugs Using Filled and Unfilled Epoxy Adhesives

Various unfilled epoxies are available in 1-part and 2-part formulations. These low-viscosity epoxies are self-leveling, eliminating problems with pinhole formation in cell corners. The plug modulus can be modified to provide stiff plugs that provide increased strength for high-pressure operation. They also provide moderate chemical resistance over broad temperature range and cure at room temperature or slightly elevated temperatures. Tape masking can allow easy delivery of plug material. Leak-free plugging of alumina extruded bodies has been shown. A single cell sealed with a glass-filled epoxy has been tested up to 55 bar without breakage.

Alumina Plug Materials with Oil-Based Binder

Oil-based alumina plugs are filled with same AA4/AA5 alumina used in substrates noted above, with Durasyn 162 (Innovene, Naperville Ill. USA) and PIB (polyisobutylene) serving as an organic binder. Plugs have been formed in alumina substrates via manual syringe injection and by tape masking. The plugging material paste is CTE-matched to the alumina substrate, with no visible cracks observed after sintering. Individual plugs tested to 6.8 bar pressure without leakage or failure.

Composition of Plugging Material:
Frit: 90.0 wt. % inorganic
  67.5 wt. % AA5 alumina
  22.5 wt. % AA4 alumina
10.0 wt. % Polymer binder
  9.0 wt. % Durasyn 162
  0.8 wt. % Oleic acid
  0.2 wt. % PIB Alumina Plug Materials with Wax-Based Binder Wax-based alumina plugs are filled with same AA4/AA5 alumina used in substrates. A wax binder is used to lower the paste's viscosity and improve flow into cells at elevated temperature (100° C.). The plugging material solidifies in place after cool down. A debind step (250° C. for 30 minutes) after plugging each end face preserves shape of plugs through sintering ramp up. Individual plugs have been tested to 6.8 bars with no leakage or failure.

Alumina-Filled Glass Plugging Materials

Alumina-filled glass plugs were made using the following plugging composition:
13.55% Cerdec MX-4462 wax
8.64%, of −63 μm glass frit of a glass composition comprising:
  70.2% silica
  20.4% boron oxide
  3.4% alumina
  1.4% lithium oxide
  2.3% sodium oxide
  1.1% calcium oxide
  1.3% fluoride
22.23% of −63 μm glass frit of a glass composition comprising:
  60.4% silica
  12.4% boron oxide
  6.1% alumina
  2.7% lithium oxide
  9.1% sodium oxide
  1.2% potassium oxide
  4.4% calcium oxide
  3.2% magnesia
  0.6% zirconia
22.23% A-3000 alumina (Alcoa)
33.33% KC#50 alumina (KC Abrasives, Kansas City, Kans.)

This composition exhibited significantly less volume shrinkage relative to all-glass plugging materials by incorporating an alumina fill fraction of 50 wt %. The wax binder enabled some leveling or flow at elevated temperatures. This plug material was plugged in pre-sintered alumina substrates and sintered at 790° C. for two hours with no volume shrinkage gaps. Additional experiments demonstrated successful tape masking of cells.

Heat Exchange

The overall heat transfer coefficient was measured for an alumina device like that of FIG. 8, using water-water heat exchange. For flow rates in the serpentine path of up to 245 ml/min U was measured at up to 2600-3400 W/m$^2$-K with coolant flow rates through the second plurality of cells 24 of up to 10 L/min.

Fluid Processing Alternatives

The devices and methods of the current invention provide for an unusually long length, high surface area fluidic passage within a relatively small volume, and one that is relatively easily manufactured. The cells unused by the first passage, as one alternative, can form a very high throughput thermal control passage while working fluids or reactants are flowed in the first passage. Alternatively, for fluids requiring a very short residence time, working fluids or reactants may be flowed through the cells unused by the first passage, and the first passage may be used for thermal control or other fluids.

What is claimed is:

1. A device for processing fluids, the device comprising:
an extruded body having multiple elongated cells therein, the body having a first fluidic passage therethrough defined principally within at least some of said cells, the first fluidic passage having a longitudinally serpentine path back and forth along the at least some of said cells, wherein the first fluidic passage is defined in part by one or more caps positioned at one or more ends of said body.

2. The device as claimed in claim 1 wherein the first fluidic passage is defined within a first plurality said cells and at least a portion of the first fluidic passage, with respect to a plane perpendicular to the cells, lies in path bordered by a second plurality of cells not of the first plurality.

3. The device as claimed in claim 2 wherein the path is one cell wide.

4. The device as claimed in claim 2 wherein a second fluidic passage is defined principally within at least some of said second plurality of cells.

5. The device as claimed in claim 4 wherein the second fluidic passage comprises a single pass through the body in parallel through multiple cells of said second plurality.

6. The device as claimed in claim 4 wherein the second fluidic passage has a longitudinally serpentine path back and forth along the at least some of said second plurality of cells.

7. The device as claimed in claim 6 wherein at least a portion of said second fluidic passage follows multiple successive respective groups of two or more cells in parallel.

8. The device as claimed in claim 1 wherein at least a portion of said first fluidic passage follows multiple successive respective groups of two or more cells in parallel.

9. The device according to claim 4 wherein said second fluidic passage lies adjacent to and along the direction of the first fluidic path such that co-current or counter-current flow is possible in the first and second fluidic passages in adjacent cells of the body.

10. The device as claimed in claim 1 wherein the first plurality of cells is contiguous.

11. The device as claimed in claim 1 wherein the first fluidic passage is defined in part by one or more plugs positioned at one or more ends of said body, with at least one respective plug of the one or more plugs plugging a respective two or more cells, the two or more cells divided by one or more shortened walls with the respective plug positioned such that the respective plug is spaced apart from the one or more shortened walls, so as to interconnect the respective two or more cells.

12. The device as claimed in claim 1 wherein the first fluidic passage is defined in part by one or more caps positioned between said fluidic passage and said body.

13. The device as claimed in claim 1 wherein the first fluidic passage is in fluid communication with the exterior of the extruded body through a surface of the extruded body generally parallel to said cells.

14. The device as claimed in claim 1 wherein the first fluidic passage is in fluid communication with the exterior of the extruded body through one or more ends of the extruded body.

15. The device as claimed in claim 1 wherein the extruded body comprises glass, glass-ceramic, or ceramic.

16. The device as claimed in claim 1 wherein the extruded body consists principally of alumina.

17. The device as claimed in claim 16 wherein the device further comprises seals or plugs comprising a glass within the following compositional limits in mole percent (mol %) of:

$2 < B_2O_3 < 7$ mol %

$75 < SiO_2 < 80$ mol %

$3 < Al_2O_3 < 5$ mol %

$2 < ZrO_2 < 5$ mol %

$9 < Na_2O + K_2O < 15$ mol %

$0 < \text{alkali earth} + \text{lanthanide} < 15$ mol % and wherein the total mole percent of SiO2, AlO3 and ZrO2 together is greater than 82 but less than 86, and wherein the total mole percent of B2O3, Na2O, K2O, alkali earths and lanthanides together is greater than 13 and less than 18.

18. The device as claimed in claim 16 wherein the device further comprises seals or plugs comprising a sintered filled glass frit.

19. A method of making a device for processing fluids, the method comprising:
providing an extruded body having extended cells therein; interconnecting at least some of said cells so as to form a first fluidic passage through said body defined principally within said at least some of said cells, the fluidic passage having a longitudinally serpentine path back and forth along the at least some of said cells, wherein the step of interconnecting at least some of said cells comprises selectively removing an end portion of a one wall dividing two cells of said body and plugging the two cells such that the material forming the plug is spaced apart from the remaining portion of the one wall, so as to interconnect the two cells.

20. The method according to claim 19 wherein the step of providing an extruded body comprises providing a green extruded body and wherein the step of plugging further comprises sintering plugs together with the extruded body.

21. The method according to claim 19 wherein the step of providing an extruded body comprises providing a sintered extruded body comprising alumina or other material having a first softening point and wherein the step of plugging further comprises plugging with a glass frit containing material having a second softening point of lower temperature than said first softening point and sintering said frit.

22. The method of claim 21 wherein the step of plugging further comprises filling the open end of at least one of the cells to be plugged with a material comprising a glass frit, such that an exterior portion of the material extends beyond the end of the cell, and such that the exterior portion of the material also extends beyond the width of the cell in the direction of a cell not to be plugged, and heating the extruded body together with the material comprising a glass frit sufficiently to cause the glass frit to consolidate and flow sufficiently to seal the one of the cells.

23. The method according to claim 19 wherein the step of plugging further comprises masking cells not to be plugged, plugging the unmasked cells, and ashing the mask during or at the beginning of sintering the plugs.

24. The method according to claim 19 wherein the step of interconnecting at least some of said cells comprises capping.

25. A method of processing a fluid, the method comprising:
providing an extruded body having multiple elongated cells therein, the body having a fluidic passage therethrough defined principally within a first plurality of said cells, the fluidic passage having a longitudinally serpentine path back and forth along the first plurality of said cells, at least a portion of the fluidic passage, with respect to a plane perpendicular to the cells, lying in path bordered by a second plurality of cells not of the first plurality; and
flowing a fluid to be processed in the fluidic passage while flowing another fluid in one or more of the second plurality of cells.

26. A method of processing a fluid, the method comprising:
providing an extruded body having multiple elongated cells therein, the body having a fluidic passage therethrough defined principally within a first plurality of said cells, the fluidic passage having a longitudinally serpentine path back and forth along the first plurality of said cells, at least a portion of the fluidic passage, with respect to a plane perpendicular to the cells, lying in path bordered by a second plurality of cells not of the first plurality; and
flowing a fluid to be processed in one or more of the second plurality of cells while flowing another fluid in the fluidic passage.

27. A device for processing fluids, the device comprising:
an extruded body having multiple elongated cells therein, the body having a first fluidic passage therethrough defined principally within at least some of said cells, the first fluidic passage having a longitudinally serpentine path back and forth along the at least some of said cells, wherein the first fluidic passage is defined in part by one or more plugs positioned at one or more ends of said body, with at least one respective plug of the one or more plugs plugging a respective two or more cells, the two or more cells divided by one or more shortened walls with the respective plug positioned such that the respective plug is spaced apart from the one or more shortened walls, so as to interconnect the respective two or more cells.

28. The device as claimed in claim 27 wherein the first fluidic passage is defined within a first plurality said cells and at least a portion of the first fluidic passage, with respect to a plane perpendicular to the cells, lies in path bordered by a second plurality of cells not of the first plurality.

29. The device as claimed in claim 28 wherein the path is one cell wide.

30. The device as claimed in claim 28 wherein a second fluidic passage is defined principally within at least some of said second plurality of cells.

31. The device as claimed in claim 30 wherein the second fluidic passage comprises a single pass through the body in parallel through multiple cells of said second plurality.

32. The device as claimed in claim 30 wherein the second fluidic passage has a longitudinally serpentine path back and forth along the at least some of said second plurality of cells.

33. The device as claimed in claim 32 wherein at least a portion of said second fluidic passage follows multiple successive respective groups of two or more cells in parallel.

34. The device as claimed in claim 27 wherein at least a portion of said first fluidic passage follows multiple successive respective groups of two or more cells in parallel.

35. The device according to claim 30 wherein said second fluidic passage lies adjacent to and along the direction of the first fluidic path such that co-current or counter-current flow is possible in the first and second fluidic passages in adjacent cells of the body.

36. The device as claimed in claim 27 wherein the first plurality of cells is contiguous.

37. The device according to claim 27, wherein the first fluidic passage is defined in part by one or more caps positioned at one or more ends of said body.

38. The device as claimed in claim 27 wherein the first fluidic passage is in fluid communication with the exterior of the extruded body through a surface of the extruded body generally parallel to said cells.

39. The device as claimed in claim 27 wherein the first fluidic passage is in fluid communication with the exterior of the extruded body through one or more ends of the extruded body.

40. The device as claimed in claim 27 wherein the extruded body comprises glass, glass-ceramic, or ceramic.

41. The device as claimed in claim 27 wherein the extruded body consists principally of alumina.

42. The device as claimed in claim 41 wherein the device further comprises seals or plugs comprising a glass within the following compositional limits in mole percent (mol %) of:

$2 < B_2O_3 < 7$ mol %

$75 < SiO_2 < 80$ mol %<

$3 < Al_2O_3 < 5$ mol %

$2 < ZrO_2 < 5$ mol %

$9 < Na_2O + K_2O < 15$ mol %

$0 < $ alkali earth+lanthanide $< 15$ mol % and wherein the total mole percent of SiO2, AlO3 and ZrO2 together is greater than 82 but less than 86, and wherein the total mole percent of B2O3, Na2O, K2O, alkali earths and lanthanides together is greater than 13 and less than 18.

43. The device as claimed in claim 41 wherein the device further comprises seals or plugs comprising a sintered filled glass frit.

* * * * *